Aug. 25, 1964     J. S. BOOTS     3,145,751
SELF-LOCKING NUT WITH SEALING CAP

Filed March 6, 1959

INVENTOR
Jay Sheridan Boots
BY
Wooster & Davis
ATTORNEYS.

United States Patent Office 3,145,751
Patented Aug. 25, 1964

3,145,751
SELF-LOCKING NUT WITH SEALING CAP
Jay Sheridan Boots, North Stamford, Conn., assignor, by mesne assignments, to Textron Industries, Inc., Norwalk, Conn., a corporation of Delaware
Filed Mar. 6, 1959, Ser. No. 797,727
1 Claim. (Cl. 151—21)

This invention relates ot a self-locking nut with a sealing cap, of a type particularly adapted for use in airplanes and electrical devices and similar applications.

In the use of self-locking nuts the locking feature is apt to detach small particles or chips from the thread of the bolt or screw threaded into the nut, and if the nut is used in such devices as electronic set-ups, these chips are liable to get into the electronic equipment, such, for example, as getting between electrical contacts and so forth, and cause trouble. Cadmium is often used in the material of these bolts or screws, and flakes of cadmium are particularly liable to cause trouble by getting into the electrical equipment. It is therefore an object of the present invention to provide an improved self-locking nut of simple construction in which the threaded self-locking portion of the nut and the free end portion of the screw or bolt on which the nut is threaded are completely enclosed and sealed, so that flakes or chips of metal separated from the screw or bolt by the self-locking means of the nut are prevented from separating and getting away from the nut, and therefore getting into electrical or electronic equipment with which the nut and bolt may be employed.

With the foregoing and other objects in view, I have devised the construction illustrated in the accompanying drawing forming a part of this specification. It is, however, to be understood the invention is not limited to the specific details of construction and arrangement shown, but may embody various changes and modifications within the scope of the invention.

Figure 5:
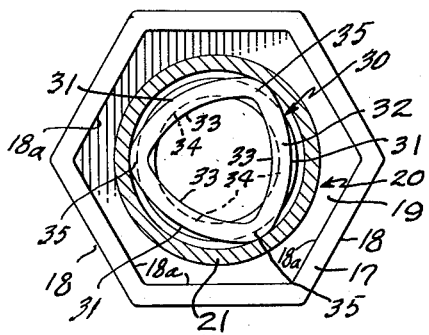
FIG. 5 is a view similar to FIG. 1 showing another modification.
Figure 6:
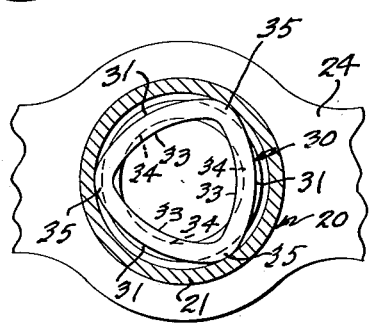
FIG. 6 is a view similar to a portion of the view of FIG. 3 showing another modification.

The nut in the form shown in the drawing is a drawn nut blanked and drawn from sheet metal, the scale of the drawing being greatly enlarged from the usual size of the nut. The form of nut shown in FIGS. 1, 2 and 5 is a nut in which the flange surrounding the threaded barrel is formed into the shape of a hexagonal outer skirt providing wrenching surfaces, while that of FIGS. 3, 4 and 6 is of the type in which the flange is left flat for attaching to a panel or similar support.

Figure 1:
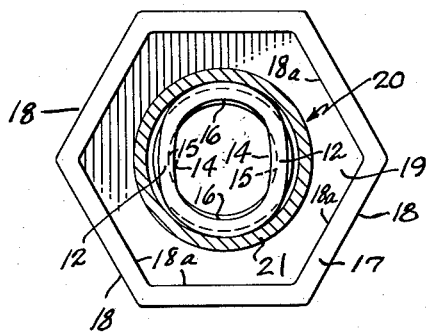
FIG. 1 is a partial plan view and partial section of a nut involving this invention.
Figure 2:
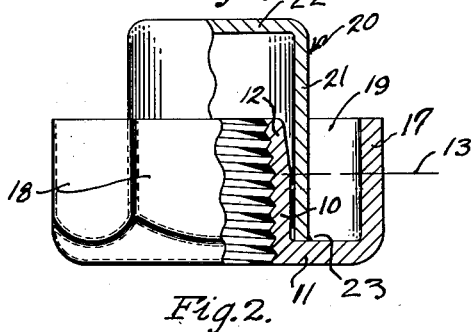
FIG. 2 is a partial side view and partial longitudinal section of the nut.

Referring first to the form of FIGS. 1 and 2, this nut comprises an internally threaded tubular barrel 10 with an integral flange 11 extending outwardly at substantially right angles to the barrel at one end thereof, the other or inner free end portion being provided with self-locking means. In the form shown this locking means is provided by deforming the free end portion of the barrel by depressing it inwardly from diametrically opposite sides of the barrel, as indicated at 12, the deforming being preferably for about half the length of the barrel and gradually increasing from about the mid-length indicated by the line 13. This deforming of the free end portion of the barrel gives this free end portion a general oval shape with concavely curved inner sides to the inwardly pressed portions, and at the pressed-in sides the inner edges 14 of the threads of the deformed portion are located somewhat inwardly of the free edges 15 of the threads on the lower or undeformed portion of the barrel. This also forces the free edges 16 of the thread portions between the inwardly pressed portions outwardly somewhat of the threads in the nondeformed portion of the barrel. With this form of self-locking means, as the nut is threaded onto a screw or bolt these inwardly pressed portions are forced outwardly against the resilient action of the material of the barrel, providing a gripping and locking effect on the screw or bolt which has a self-locking effect, greatly reducing the tendency of the nut to loosen under vibration or other effects in use. The outer portion of the flange 11 is drawn and formed to provide a hexagonal outer skirt 17 extending substantially at right angles to the flange and parallel to the barrel, providing flat wrenching surfaces 18 and 18a. This skirt is spaced from the barrel by an internal peripheral channel 19 which is closed at the bottom of the nut by a transverse portion 11 of the flange extending between and connecting the barrel and the hexagonal skirt. The skirt is preferably extended for at least the full height of the barrel to provide an enclosing protection and also provide greater wrenching surfaces extending the full height of the nut.

Telescoped over and embracing the threaded barrel 10 is a closure cap 20 which is in the form of an inverted cupped member, the tubular sides 21 of which are telescoped or slid down over the barrel 10 with its lower free end edge resting on top of the flange 11. It is preferably a good fit on the barrel. The sides are of a length so that the upper closed end or top wall 22 is spaced somewhat above the free upper end of the barrel 10 to provide a space for clearance between this closed wall and the end of the screw or bolt on which the nut may be threaded. The lower free end of the cap is sealed to the flange 11 throughout its periphery preferably by brazing, as indicated at 23. It will be seen from this construction and arrangement that the threaded barrel and the threaded portion of the screw or bolt onto which the nut is threaded, including the free end of the screw or bolt which might come to or project somewhat through the upper free end of the barrel, is entirely enclosed in a sealed chamber by this cap, which will positively prevent any chips or other particles which might be separated from the screw or bolt by the self-locking feature of the nut from getting separated from the nut and getting into any electronic or other electrical structure or system with which this nut may be used. It does prevent any chips or particles, for example, getting into any location in an electronic or other electrical device where they might cause a short circuit, or get between the contacts of a switch, for example, or get into any other position where they might cause incorrect functioning of the device. It also protects the threads of the bolt, and when without the cap if the end of the screw should project out of the nut it might cause abrading or have other adverse effects. This is prevented by the cap.

Figure 3:
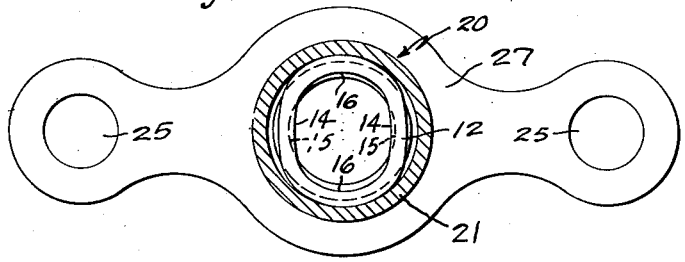
FIG. 3 is a view similar to FIG. 1 showing a modified form of nut.
Figure 4:
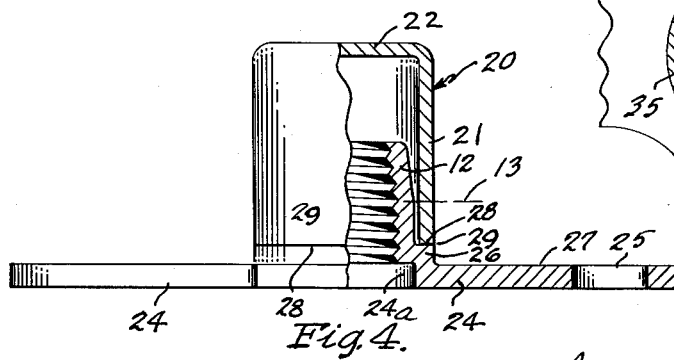
FIG. 4 is a partial side view and partial longitudinal section thereof.

The form of device shown in FIGS. 3 and 4 is the same as that of FIGS. 1 and 2 as far as forming of the internally threaded barrel 10 and the deforming of the free end portions for a self-locking effect is concerned. This barrel is also enclosed and sealed in the closure cap the same as in the first form. In this form, however, the flange 24 extending outwardly from the lower end of the barrel is left flat for resting against and being secured to a support, such for example as a panel, with which the nut may be used, such, for example, as bolting or riveting to the support through openings 25, welding or otherwise securing to the support. However, in this form, although the lower free end of the cap 21 may rest on and be sealed to the top surface of the body portion of the flange, it is preferred to form this flange with an offset 26 adjacent the top surface 27 of the body portion, thus providing an annular shoulder 28 surrounding the barrel and spaced a short distance above the top 27 of the body of the flange on which this free end edge of the cap is seated and to which it is secured and sealed, preferably by brazing, as indicated at 29. This provides an enlargement 24a at the entrance to the barrel which is a material assistance to insertion of the end of a bolt or screw. The same offset and enlargement could be applied to the form of nut of FIGS. 1, 2 and 5 if desired. This effect could also be described as formed in the lower end of the barrel as it is provided at the junction of the barrel and flange. The annular shoulder 28 could also be described as being on the outer surface of the barrel. Otherwise the structure and the result and action secured are the same as that in the form of FIGS. 1 and 2.

In the modified form of FIG. 5, the structure and arrangement is the same as that of FIGS. 1 and 2, except that the internal threaded barrel 30 in providing the self-locking feature at its upper free end portion is deformed by pressing it inwardly at three points 31 spaced equally about the periphery of the barrel. This provides three arc-shaped portions 32. The inner concavely curved free edges 34 of the threads are spaced inwardly somewhat of the nondeformed lower portion of the barrel, and the connecting portions 35 between the inwardly pressed portions 32 are forced outwardly somewhat and more acutely concaved. This arrangement provides three equally spaced locking portions 33 cooperating with the threads of a screw or bolt on which the nut may be threaded, thus increasing the locking effect over the oval-shaped deformed portion of FIGS. 1 and 2, and also, although the oval shape of FIGS. 1 and 2 is self-centered on the bolt, the three equally spaced inwardly pressed non-locking means provide a still more effective self-centering of the nut on the bolt. This deformed barrel is telescoped in and seated by the closure cap 20, the same as in FIGS. 1 and 2, and thus prevents chips and particles which might be separated from the threaded screw or bolt becoming separated from the nut and getting into any electronic or other device with which the nut may be used.

The modified form of nut shown in FIG. 6 is the same type as that shown in FIGS. 3 and 4 employing the integral flat flange 24 at the lower end of the barrel. In this nut, however, the barrel is deformed at its free end portion to secure the self-locking effect, by pressing it inwardly at three points 31 equally spaced about its periphery, the same as in the form of FIG. 5, thus producing the same effect and the same advantages as are secured by this type of deforming as described in connection with FIG. 5.

It will be seen from the above that this provides a very simple construction of nut, which effectively prevents escape of any chips or small particles which might be detached from the thread of the screw or bolt by the self-locking feature, and will retain them so that there is no chance of their getting into any electronic set-up where these chips or particles might be liable to get into the electronic equipment, such, for example, as getting between electrical contacts, or otherwise adversely affecting this equipment, and so causing trouble. In all forms of the nut shown it is formed and blanked from sheet metal of suitable gauge or thickness, both in forming the body portion of the nut as well as the outer skirt, and although it is preferred to use the type of locking means provided by the deforming shown and described, this sealing and enclosing cap could be used with other types of self-locking means. The sealing cap is also blanked and drawn from sheet metal. This cap may be a close fit on the barrel and forced down over the barrel and held by the friction of this close fit, but it is also preferably sealed at its lower free peripheral edge by brazing as above described.

Having thus set forth the nature of my invention I claim:

A sealed self-locking nut comprising: a tubular barrel made of a flexible material and having an internal screw thread; one end of said barrel being deformed by having equally spaced circumferential portions displaced inwardly and intermediate equally spaced circumferential portions displaced outwardly and thereby providing self-locking means that is arranged to flex and cooperate with a bolt that is threaded into said barrel to automatically lock the bolt to the barrel; a laterally extending flange integrally formed at the other end of said barrel; an offset portion at the junction of said barrel and flange providing an annular shoulder at the outer side of said barrel spaced a short distance above the top of the remainder of said flange and an enlarged entrance to said barrel; and a closure cap in the form of an inverted cupped member that is disposed to enclose said barrel and has the edge about its open end seated on, secured and sealed to said shoulder throughout its periphery; the remainder of said cap being unattached to said barrel, rigid relative thereto and non-deformable in normal operation, whereby the entire length of said barrel within said cap is free to move relative to said cap and said self-locking means is thereby free to flex within and independently of said cap to permit the threading and locking of a bolt in said barrel.

References Cited in the file of this patent

UNITED STATES PATENTS

| | | |
|---|---|---|
| 1,262,743 | Bronson | Apr. 16, 1918 |
| 1,830,787 | Ferry | Nov. 10, 1931 |
| 2,090,337 | Stoll | Aug. 17, 1937 |
| 2,406,070 | Funk | Aug. 20, 1946 |
| 2,637,361 | Nagel | May 5, 1953 |
| 2,651,060 | Misch | Sept. 8, 1953 |
| 2,816,591 | Reiner | Dec. 17, 1957 |
| 2,923,339 | Skidmore | Feb. 2, 1960 |

FOREIGN PATENTS

| | | |
|---|---|---|
| 1,092,771 | France | Nov. 10, 1954 |
| 789,395 | Great Britain | Jan. 22, 1958 |
| 445,374 | Italy | Feb. 14, 1949 |